United States Patent [19]

Aly et al.

[11] Patent Number: 4,896,704
[45] Date of Patent: Jan. 30, 1990

[54] LOADING TECHNIQUES FOR DOWNFLOW REACTORS

[75] Inventors: Fouad A. Aly, Newtown; Paul W. Snyder, Washington Crossing, both of Pa.

[73] Assignee: Mobil Oil Corp., New York, N.Y.

[21] Appl. No.: 148,746

[22] Filed: Jan. 27, 1988

[51] Int. Cl.⁴ .......................... B65B 1/00; B65B 1/04
[52] U.S. Cl. ............................. 141/9; 53/474; 53/475; 422/191; 422/193; 422/216; 422/219
[58] Field of Search ............... 422/191, 193, 219, 221, 422/232, 233, 177, 211, 213, 216; 141/9; 53/474, 475

[56] References Cited

U.S. PATENT DOCUMENTS

| | | | |
|---|---|---|---|
| 2,006,078 | 6/1935 | Pyzel | 422/191 X |
| 2,248,734 | 8/1941 | Barr | 422/191 X |
| 2,306,011 | 12/1942 | Burk et al. | 23/288 |
| 2,310,907 | 2/1943 | McMillan | 422/219 X |
| 2,421,744 | 6/1947 | Daniels et al. | 422/191 X |
| 2,423,907 | 7/1947 | Schulze | 422/191 X |
| 2,646,391 | 7/1953 | Houdry | 422/191 |
| 3,048,468 | 8/1962 | Watkins | 422/191 X |
| 3,090,667 | 5/1963 | Connellan | 208/146 X |
| 3,100,140 | 8/1963 | Ashley et al. | 422/177 |
| 3,295,565 | 1/1967 | Grandy, Jr. | 422/177 |
| 3,595,626 | 7/1971 | Sowards | 23/283 |
| 3,792,981 | 2/1974 | Hettick et al. | 422/193 X |
| 4,007,015 | 2/1977 | Barber | 23/281 |
| 4,225,562 | 9/1980 | Anderson | 422/188 |
| 4,285,910 | 8/1981 | Kennedy, Jr. | 422/219 |
| 4,640,339 | 2/1987 | Klaren | 422/146 X |

Primary Examiner—Barry S. Richman
Assistant Examiner—Amalia L. Santiago
Attorney, Agent, or Firm—Alexander J. McKillop; Charles J. Speciale; Robert B. Furr, Jr.

[57] ABSTRACT

The present invention comprises a fixed bed reactor, a method of loading catalyst into the reactor to minimize plugging and to improve the uniformity of fluid flow across the reactor, and a hydrotreating process employing the novel reactor. The system utilizes removable partition forms and/or permanent interbed baskets to create gradual transition zones between catalyst layers and to significantly increase the open area available for flow at the interface of such zones.

9 Claims, 3 Drawing Sheets

LOADING TECHNIQUES FOR DOWNFLOW REACTORS

FIELD OF THE INVENTION

This invention relates to the field of packed bed catalytic reactor design. More particularly, the invention relates to a method and apparatus for preventing the accumulation of corrosion and fouling products, increasing the uniformity of flow, and minimizing pressure drop across a packed bed reactor.

BACKGROUND OF THE INVENTION

The sinuous flow paths through the length of a fixed bed catalytic reactor provide for intimate contact between the reactant fluid and the active sites of the catalyst. The catalyst bed is also highly effective as a filter medium, retaining much of the solid material suspended in the reactant mixture. These suspended solids collect in the void spaces in the reactor bed causing increased pressure drop and non-uniform flow patterns.

One objective of fixed-bed reactor design is to maximize unit throughput while minimizing pressure drop across the reactor. Maintaining a uniform distribution of cross-sectional open area across the reactor bed promotes uniform flow and allows the maximum contact time between catalyst and reactants for a given fluid space velocity. Further, a uniform distribution of cross-sectional open area tends to discourage the accumulation of undesirable deposits in the catalyst bed.

The problem of catalyst bed plugging in downflow reactors is known to follow two distinct mechanisms. The first is plugging due to upstream corrosion products and other solids carried in the reactor charge stream. The second is plugging due to formation of solids within the catalyst bed.

For example, in hydrotreating reactors, plugs formed at the top of the catalyst bed (near the reactor inlet) typically consist of salts of iron and sodium. These salts are the products of corrosion reactions occurring upstream from the reactor. The current industrial practice is to install scale baskets (wire mesh baskets) at the top of the catalyst bed.

Plugs formed within the catalyst bed typically consist of metal sulfides resulting from the reaction of hydrogen sulfide with the organometallic compounds present in the feed.

The plugging problem is practically pronounced in reactors having catalyst loaded in longitudinal zones or beds. The plugging material in this case tends to migrate downward, filling the void space between the catalyst particles and collecting at the interface separating the two catalyst layers, thus accelerating the buildup of blockages and the increase in pressure drop.

Pressure drop continues to increase until continued operation is no longer safe and/or economicl. At this point, the reactor is taken out of service and cleaned. The cost of this industry-wide problem is reflected not only in lost profits due to process unit downtime, but also in the highly labor-intensive activity of mechanically removing catalyst and corrosion products from the reactor vessel.

SUMMARY OF THE INVENTION

Accordingly, it is an object of the invention to provide a method and apparatus to control plugging caused by the accumulation of metal salts formed both upstream from the reactor and in the catalyst bed itself. This system utilizes removable partition forms and/or permanent inter-bed baskets to create gradual transition zones between catalyst layers and to significantly increase the open area available for flow at the interface of such zones. The system minimizes the adverse impact of particulate impurities and fines on the build-up of catalyst bed pressure drop and thus allows longer operating runs.

According to the present invention, transition zones between successive beds of catalyst in a reactor are formed by loading a portion of a first catalyst into a reactor vessel, positioning a loading form on the bed of the first catalyst, loading some of the open-ended compartments of the loading form with the first catalyst, and then loading a second catalyst into the remaining open-ended compartments of the loading form. The loading process may be repeated for successive pairs of catalyst beds to form the desired transition zones each of which comprises vertically extensive columns of the catalyst in the lower of the two successive, superimposed catalyst beds extending into the upper catalyst bed.

The loading form may be a removable partitioning device used only during the loading procedure, after which it is removed or, alternatively, it may permit the passage of reactants through it while in place in the reactor. In the second case, the form may constitute a permanet scale basket which not only permits the catalyst to be loaded with intervening transistion zones as described above, but which may also function as a scale basket in use.

DETAILED DESCRIPTION

I. PARTITION FORM AND INTER-BED SCALE BASKET APPARATUS

The present invention is described herein with reference to particulate catalysts. However, it is to be understood that the invention is not limited to particulate catalysts and is also applicable to beds of inert or other particulate material. It is further to be understood that while the invention is described as useful to prevent the accumulation of corrosion products such as metal salts, it is not limited to this application but is also useful to prevent the accumulation of solid materials in general including fouling products.

Figure 1:
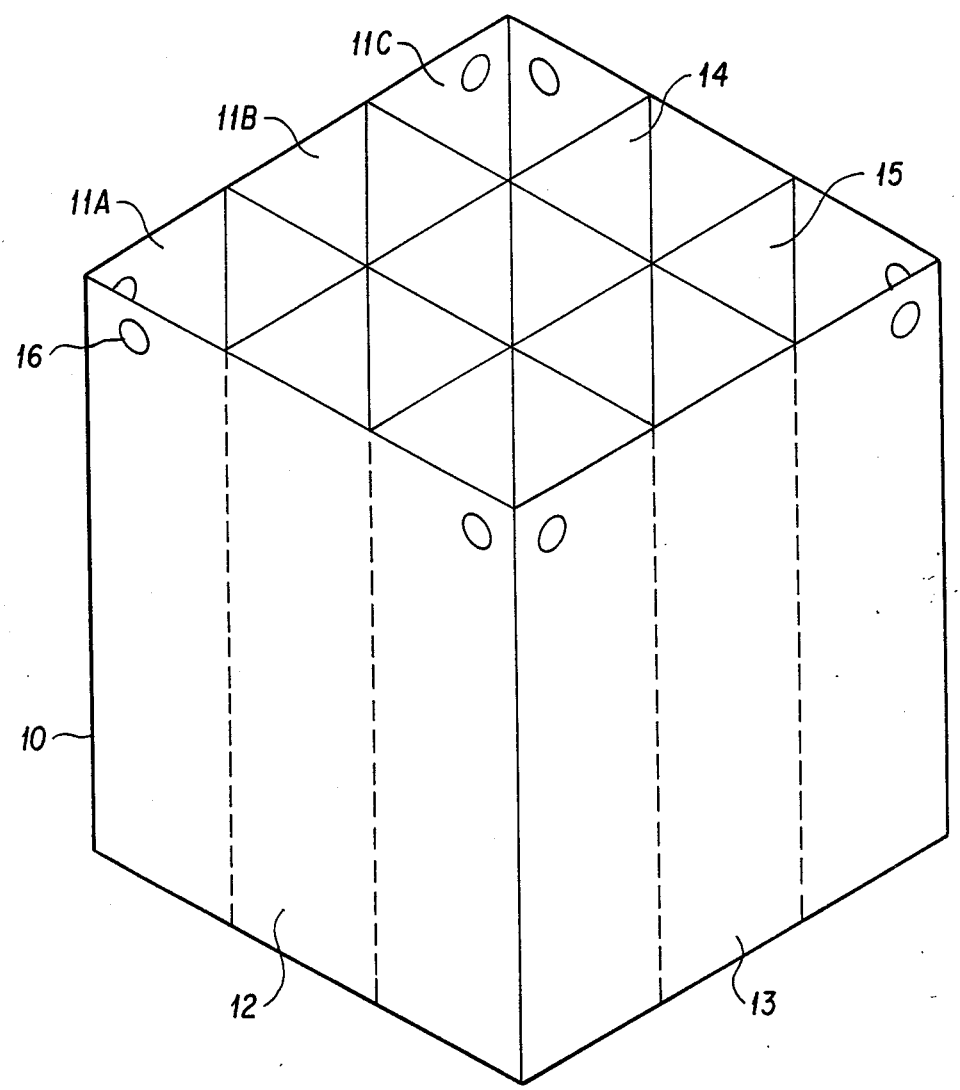
FIG. 1 is an isometric view of a removable partition form.

The removable partition form 10 shown generally in FIG. 1 of the drawings comprises longitudinally extensive containers 11A, 11B and 11C (only three are designated) formed by outer plates 12 and 13 (only two are designated) and cross-member plates 14 and 15 (only two are designated). Both the top and the bottom of the containers are open. The partition form is made up of contiguous groups of these containers, each being circular or polygonal in cross-section, the noncircular polygonal containers having between three and ten sides. FIG. 1 illustrates a four-sided removable partition form.

In a preferred embodiment, the removable partition forms are constructed of sheet or plate metal stock. Lifting holes 16 (only one is designated) are positioned in the upper corners of the removable partition form.

The removable partition forms are removed from the reactor before unit operation begins. Thus, these forms need not be alloyed to resist the corrosive reactor environment. The removable partition forms must be constructed not only to retain their shape when filled with catalyst, but also to withstand the stress applied when they are lifted out of the catalyst bed using chains, ropes, or cables.

Figure 2:
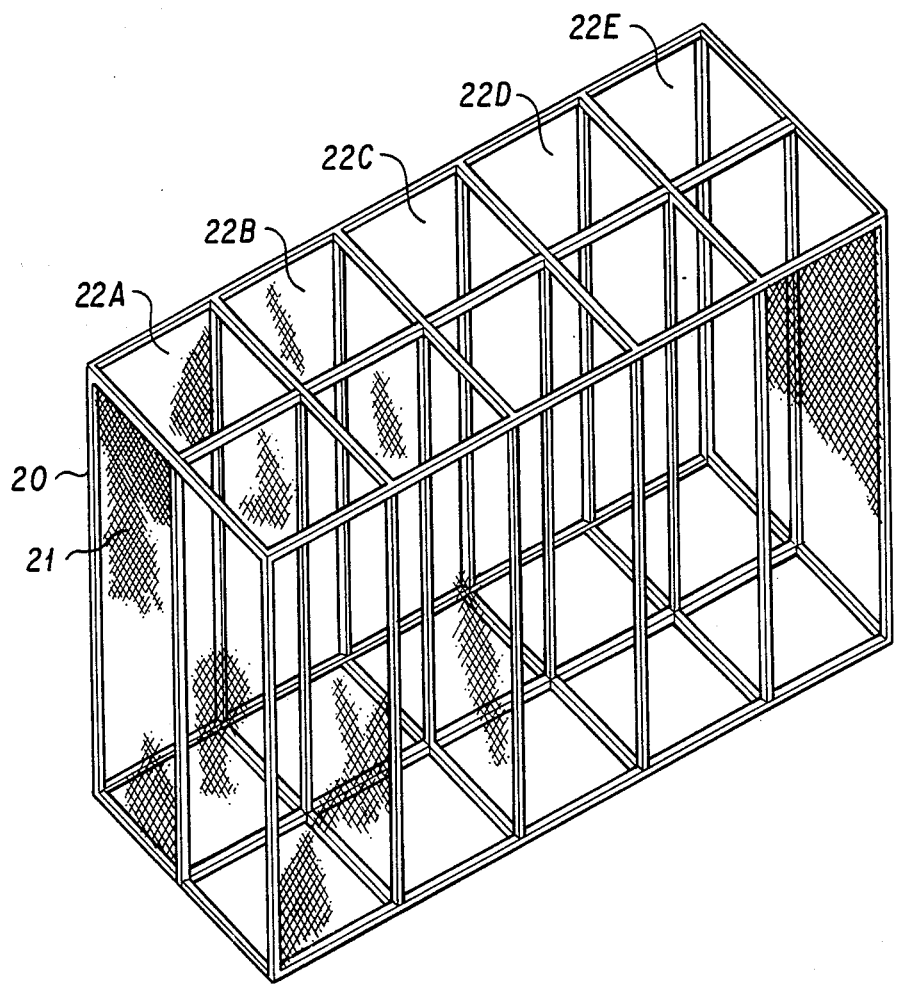
FIG. 2 is an isometric view of a permanent interbed scale basket.

The permanent inter-bed scale basket shown in FIG. 2 comprises a frame 20, the sides of which are covered with a perforate material 21. The frame 20 and perforate material 21 form longitudinally extensive containers 22A, 22B, 22C, 22D and 22E (only five are designated) open on both the top and bottom. The permanent inter-bed scale basket form is made up of contiguous groups of these containers, each being circular or polygonal in cross-section, the noncircular polygonal containers having between three and ten sides. FIG. 2 illustrates a four-sided permanent inter-bed scale basket.

The sides of the permanent inter-bed scale basket may be covered with wire mesh cloth. The mesh size, wire diameter, and metallurgy may vary depending on the catalyst and reaction conditions used. As the evolution of corrosion products would tendto plug the catalyst bed downstream of the corrosion product source, it is preferred to construct the permanent inter-bed scale baskets of an alloy at least as resistant to the corrosive environment of the process reactor as the inner shell of the reactor itself.

II. METHOD FOR CREATING TRANSITION ZONES

Referrring to FIG. 3, the transition zones are created as follows:

1. Part of a first catalyst 31 is loaded into the reactor 30.
2. The removable partition forms or the permanent scale baskets are lowered into the reactor and set on top of the layer of the first catalyst 31.
3. Part of the individual compartments of either the forms or the baskets is covered with a suitable material to prevent filling them with the first catalyst during step (4).
4. Loading of the first catalyst is continued until it reaches the top of the forms or baskets. At this point, all the uncovered compartments and the space between adjacent forms or baskets and between the forms or baskets and the reactor wall are full of the first catalyst.
5. The covers used in step (3) above are removed and all the empty compartments are filled with a second catalyst 32, thus creating a first transition zone 33 (only two columns are designated).
6. If removable partition forms are being used, they are lifted out of the catalyst bed.
7. Loading of the second catalyst 32 continues.
8. If a third catalyst bed is required, steps 1-7 are repeated using the second catalyst 33 and a third catalyst 35 to create a second transition zone 34 (only two columns are designated).

The use of the partition forms as described above creates a transition zone between the successive superimposed catalyst beds which can be repeated between each successive superimposed pair of beds. The transition zone created comprises vertically extensive columns of the catalyst in the lower bed extending up into the next higher bed. The columns of the catalyst have a cross-sectional configuration dictated by the shape of the compartments in the partition form or the permanent interbed scale basket and have a height set by the extent to which the first catalyst is loaded in step (4) above, with a maximum height dictated by the height of the form or the basket.

Figure 3A:
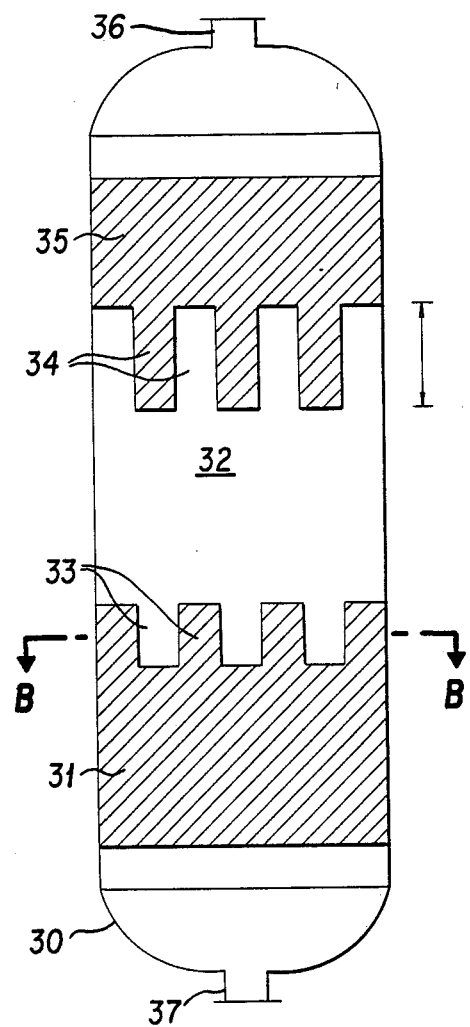
FIG. 3A is a simplified cross-sectional view of a multiple bed reactor having three catalyst beds.

A reactor with three superimposed catalyst beds separated by two columnar transition zones is shown in FIG. 3A. A reactor vessel 30 with upper inlet 36 and lower outlet 37 has three catalyst beds 31, 32 and 35 of a first, a second and a third catalyst, respectively, with transition zones 33 and 34 between the beds.

Figure 3B:
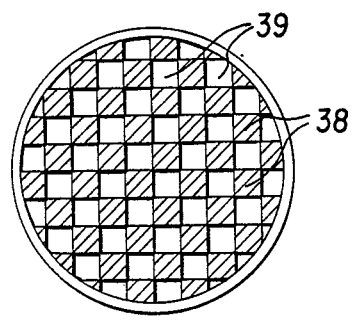
FIG. 3B is a simplified plan view of the catalyst transistion zone taken at plane B—B'.

Referring to FIG. 3B, a cross-sectional view of the lower transition zone 33 shows square section columns of the lower catalyst 38 (the first catalyst) extending upwards past downwardly extending columns of the upper catalyst 39 (the second catalyst). The upper transition zone is similarly formed with intermeshing columns of the second and third catalysts. While square columns are shown, columns having at least three sides may be used.

Hydrotreating Process

As described above, the reactor of the present invention is particularly useful in the hydrotreating of petroleum fractions. The following patents provide examples of suitable feedstocks and process conditions and are incorporated by reference as if set forth at length herein.

U.S. Pat. No. 4,696,732 discloses a process for simultaneously hydrotreating and dewaxing petroleum fractions. The process utilizes a single catalyst system which includes a hydrotreating component impregnated on a controlled pore size base and at least two catalyst components selected from any of an intermediate pore zeolite, a lage pore zeolite, a zeolite Beta and a large pore non-zeolite catalyst.

U.S. Pat. No. 4,600,503 teaches a method for hydrotreating residual oil which comprises utilizing a hydrotreating catalyst which contains a thermally stable composition comprising a layered metal oxide.

U.S. Pat. No. 4,548,709 describes the demetalation and desulfurization of residual oils by adding the oil to an aromatic solvent and contacting the mixture in the presence of hydrogen with an alumina having dual pore size distribution in the ranges of 90 to 200 Angstrom units and 1000 to 5000 Angstrom units.

U.S. Pat. No. 4,518,485 teaches a process for dewaxing a hydrocarbon feedstock with a relatively high pour point containing paraffin selected from a group of normal paraffins and slightly branched paraffins and sulfur and nitrogen compounds which comprises subjecting oil to hydrotreating in a hydrotreating zone operated at hydrotreating conditions sufficient to remove at least a portion of said sulfur and nitrogen compounds and subjecting said hydrotreated oil to catalytic dewaxing by contacting said oil with a catalyst comprising zeolite Beta having a silica/alumina ratio of at least 30:1 and a hydrogenation/dehydrogenation component under isomerization conditions.

U.S. Pat. No. 4,510,044 provides a single-stage catalyst system and process for using said catalyst system in a single-stage operation for hydrodewaxing and hydrotreating petroleum residua. The catalyst comprises a ZSM-5 type zeolite in an alumina binder having specified metals content and pore diameter of less than 150 Angstroms.

What is claimed is:

1. A method for loading catalyst in superimposed fixed beds in a reactor vessel comprising the steps of:
   a. loading a portion of a first catalyst into a reactor vessel thereby forming a bed of first catalyst;
   b. positioning a loading form comprising a plurality of open-ended compartments defined by vertically extensive walls onto the bed of said first catalyst;
   c. loading said first catalyst into some of said open-ended compartments;
   d. loading a second catalyst into the remaining open-ended compartments to form a vertically extensive transition zone comprising vertically extensive columnar sections of said first catalyst and vertically extensive columnar sections of said second catalyst;
   e. loading said second catalyst onto said transition zone to form a bed of said second catalyst.

2. The process of claim 1 further comprising:
   a positioning a loading form comprising a plurality of open-ended compartments defined by vertially extensive walls on the bed of said second catalyst;
   b. loading said second catalyst into some of said open-ended compartments;
   c. loading a third catalyst into the remaining open-ended compartments to form a second vertically extensive transition zone comprising vertically extensive columnar sections of said second catalyst and vertically extensive columnar sections of said third catalyst;
   d. loading said third catalyst onto said transition zone to form a bed of said third catalyst.

3. The process of claim 1 wherein said loading form comprises substantially imperforate walls.

4. The process of claim 3 wherein said loading form is removed after creating said transition zone.

5. The process of claim 1 wherein said form comprises perforate walls.

6. The process of claim 5 wherein said perforate walls are mesh walls.

7. The process of claim 1 wherein said loading form has three, four, five or six sides.

8. The process of claim 1 wherein some of the compartments are covered while filling the remaining open-ended compartments with said first catalyst.

9. The process of claim 8 wherein said covered compartments are uncovered to load said second catalyst.

* * * * *

UNITED STATES PATENT AND TRADEMARK OFFICE
CERTIFICATE OF CORRECTION

PATENT NO. : 4,896,704

DATED : January 30, 1990

INVENTOR(S) : F.A. Aly et al

It is certified that error appears in the above-identified patent and that said Letters Patent is hereby corrected as shown below:

| | |
|---|---|
| Col. 1, line 56 | "economicl" should be --economical-- |
| Col. 2, line 29 | "permanet" should be --permanent-- |
| Col. 3, line 28 | "tendto" should be --tend to-- |
| Col. 4, line 37 | "lage" should be --large-- |
| Col. 5, claim 2 line 20 | insert --.-- after "a" (first instance) |
| Col. 5, claim 2 line 21 | "vertially" should be --vertically-- |

Signed and Sealed this

Eleventh Day of December, 1990

Attest:

HARRY F. MANBECK, JR.

*Attesting Officer*         *Commissioner of Patents and Trademarks*